United States Patent
Duong et al.

(10) Patent No.: US 12,315,914 B2
(45) Date of Patent: *May 27, 2025

(54) ELEMENTAL METAL AND CARBON MIXTURES FOR ENERGY STORAGE DEVICES

(71) Applicant: Tesla, Inc., Austin, TX (US)

(72) Inventors: Hieu Minh Duong, San Diego, CA (US); Porter Mitchell, Chandler, AZ (US); Mohammed-Yazid Saidi, San Diego, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,795

(22) Filed: Jan. 11, 2024

(65) Prior Publication Data

US 2024/0154096 A1    May 9, 2024

Related U.S. Application Data

(63) Continuation of application No. 17/819,558, filed on Aug. 12, 2022, now Pat. No. 11,901,549, which is a
(Continued)

(51) Int. Cl.
*H01M 4/36* (2006.01)
*H01G 11/42* (2013.01)
(Continued)

(52) U.S. Cl.
CPC ............ *H01M 4/364* (2013.01); *H01G 11/42* (2013.01); *H01G 11/50* (2013.01); *H01G 11/52* (2013.01);
(Continued)

(58) Field of Classification Search
None
See application file for complete search history.

(56) References Cited

U.S. PATENT DOCUMENTS

| | | |
|---|---|---|
| 5,595,837 A | 1/1997 | Olsen |
| 5,743,921 A | 4/1998 | Nazri |

(Continued)

FOREIGN PATENT DOCUMENTS

| | | |
|---|---|---|
| CN | 1719656 | 1/2006 |
| CN | 104733694 A | 6/2015 |

(Continued)

OTHER PUBLICATIONS

Hou et al., 2015, Hierarchical porous nitrogen-doped carbon nanosheets derived from silk for ultrahigh-capacity battery anodes and supercapacitors. ACS nano 9.3 : 2556-2564.
(Continued)

*Primary Examiner* — Alix E Eggerding
(74) *Attorney, Agent, or Firm* — Knobbe, Martens, Olson & Bear, LLP

(57) ABSTRACT

An energy storage device can include a first electrode, a second electrode and a separator between the first electrode and the second electrode wherein the first electrode or the second electrode includes elemental lithium metal and carbon particles. A method for fabricating an energy storage device can include forming a first electrode and a second electrode, and inserting a separator between the first electrode and the second electrode, where forming the first electrode or the second electrode can include combining elemental lithium metal and a plurality of carbon particles.

27 Claims, 9 Drawing Sheets
(2 of 9 Drawing Sheet(s) Filed in Color)

Related U.S. Application Data continuation of application No. 16/665,430, filed on Oct. 28, 2019, now Pat. No. 11,527,747, which is a continuation of application No. 15/435,193, filed on Feb. 16, 2017, now Pat. No. 10,461,319.

(60) Provisional application No. 62/298,642, filed on Feb. 23, 2016.

(51) Int. Cl.
| | |
|---|---|
| H01G 11/50 | (2013.01) |
| H01G 11/52 | (2013.01) |
| H01G 11/86 | (2013.01) |
| H01M 4/133 | (2010.01) |
| H01M 4/134 | (2010.01) |
| H01M 4/1393 | (2010.01) |
| H01M 4/1395 | (2010.01) |
| H01M 4/38 | (2006.01) |
| H01M 4/587 | (2010.01) |
| H01M 4/62 | (2006.01) |
| H01M 10/0525 | (2010.01) |
| H01M 10/052 | (2010.01) |

(52) U.S. Cl.
CPC ............ *H01G 11/86* (2013.01); *H01M 4/133* (2013.01); *H01M 4/134* (2013.01); *H01M 4/1393* (2013.01); *H01M 4/1395* (2013.01); *H01M 4/382* (2013.01); *H01M 4/587* (2013.01); *H01M 4/623* (2013.01); *H01M 10/0525* (2013.01); *H01M 10/052* (2013.01)

(56) References Cited

U.S. PATENT DOCUMENTS

| | | | |
|---|---|---|---|
| 5,744,258 | A | 4/1998 | Bai |
| 6,096,454 | A | 8/2000 | Tran et al. |
| 6,706,447 | B2 | 3/2004 | Gao |
| 7,227,737 | B2 | 6/2007 | Mitchell et al. |
| 8,241,793 | B2 | 8/2012 | Zhamu |
| 8,815,443 | B2 | 8/2014 | Mitchell et al. |
| 9,525,168 | B2 | 12/2016 | Mitchell et al. |
| 10,461,319 | B2 | 10/2019 | Duong et al. |
| 10,840,540 | B2 * | 11/2020 | Duong ................. H01M 4/625 |
| 11,527,747 | B2 | 12/2022 | Duong et al. |
| 11,888,108 | B2 | 1/2024 | Duong et al. |
| 11,901,549 | B2 * | 2/2024 | Duong ................ H01M 4/1393 |
| 2003/0113252 | A1 | 6/2003 | Chen |
| 2005/0130043 | A1 | 6/2005 | Gao |
| 2005/0250011 | A1 | 11/2005 | Porter et al. |
| 2009/0123844 | A1 | 5/2009 | Morigaki |
| 2011/0129730 | A1 | 6/2011 | Kasai |
| 2013/0045427 | A1 | 2/2013 | Zhamu et al. |
| 2013/0155577 | A1 | 6/2013 | Yang |
| 2013/0157106 | A1 | 6/2013 | Lee et al. |
| 2013/0157141 | A1 | 6/2013 | Zhong |
| 2013/0171502 | A1 | 7/2013 | Chen |
| 2013/0271085 | A1 | 10/2013 | Chen et al. |
| 2014/0313639 | A1 | 10/2014 | Santhanam |
| 2016/0104882 | A1 | 4/2016 | Yushin et al. |
| 2016/0126543 | A1 | 5/2016 | Ota et al. |
| 2016/0218351 | A1 | 7/2016 | Dudney et al. |
| 2016/0240841 | A1 | 8/2016 | He et al. |
| 2016/0260967 | A1 | 9/2016 | Matus et al. |
| 2016/0351893 | A1 | 12/2016 | Wietelmann et al. |
| 2017/0133662 | A1 | 5/2017 | Cui et al. |
| 2023/0036768 | A1 | 2/2023 | Duong et al. |

FOREIGN PATENT DOCUMENTS

| | | |
|---|---|---|
| CN | 105374991 | 3/2016 |
| EP | 2 876 709 | 5/2015 |
| EP | 3 157 078 | 4/2017 |
| JP | 64-41162 | 2/1989 |
| JP | 05-234621 | 9/1993 |
| JP | 09-249407 | 9/1997 |
| JP | 11-25975 | 1/1999 |
| JP | 2001-185214 | 7/2001 |
| JP | 2003-077458 | 3/2003 |
| JP | 2005-166325 | 6/2005 |
| JP | 2006-294326 | 10/2006 |
| JP | 2011-204903 | 10/2011 |
| JP | 2012-028366 | 2/2012 |
| JP | 2012-151395 | 8/2012 |
| JP | 2012-204306 | 10/2012 |
| JP | 2014-051414 | 3/2014 |
| WO | WO 10/008058 | 1/2010 |
| WO | WO 12/054766 | 4/2012 |
| WO | WO 13/082330 | 6/2013 |
| WO | WO 12/099264 | 6/2014 |
| WO | WO 15/139660 | 9/2015 |
| WO | WO 15/161289 | 10/2015 |
| WO | WO 15/190898 | 12/2015 |
| WO | WO 16/073438 | 5/2016 |
| WO | WO 16/123471 | 8/2016 |

OTHER PUBLICATIONS

Li et al. "Evaluation residual moisture in lithium-ion battery electrodes and its effect on electrode performance." 2015 MRS Fall Meeting.

Rendek, Louis J., et al. "Reactivity of lithium toward propylene carbonate: Infrared reflection absorption spectroscopy studies in ultrahigh vacuum." Langmuir 17.3 (2001): 849-851.

Simon. "Report Documentation Page" (2010) XP055360931, retrieved from internet: URL: http://oai.dtic.mil/oai/oai?verb=getRecord&metadataPrefix=html&identifier=ADA546196 [retrieved on Mar. 31, 2017].

Wood III et al. "Technical and economic analysis of solvent-based lithium-ion electrode drying with water and NMP". Drying Technology 2017 Taylor & Francis.

Mundszinger et al., Dec. 20, 2016, FIB-tomography of graphite anode particles for lithium ion batteries, European Microscopy Congress 2016: Proceedings, pp. 854-855.

* cited by examiner

ELEMENTAL METAL AND CARBON MIXTURES FOR ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application is a continuation of U.S. application Ser. No. 17/819,558, filed Aug. 12, 2022, which is a continuation of U.S. application Ser. No. 16/665,430, filed Oct. 28, 2019, which is a continuation of U.S. application Ser. No. 15/435,193, filed Feb. 16, 2017, which claims priority to U.S. Provisional App. No. 62/298,642, filed Feb. 23, 2016, are each hereby incorporated by reference in their entirety.

BACKGROUND

Field

The present disclosure relates generally to compositions for energy storage device electrodes, energy storage devices implementing such electrodes, and related methods.

Description of the Related Art

Energy storage devices, such as lithium ion, sodium ion, potassium ion, magnesium ion and/or aluminum ion based energy storage devices, may be used to power a diverse range of electronic devices. For example, batteries and/or capacitors using these materials can be implemented in a variety of applications, including for example within wind power generation systems, uninterruptible power source systems (UPS), photo voltaic power generation, and/or energy recovery systems in industrial machinery and transportation systems. Electrodes of such batteries and/or capacitors may undergo a pre-doping process during fabrication of the electrodes.

SUMMARY

In some aspects, an energy storage device can include a first electrode, a second electrode, and a separator between the first electrode and the second electrode, where at least one of the first electrode and the second electrode includes carbon particles and elemental metal. The elemental metal can comprise, consist essentially of, or consist of elemental lithium metal. The elemental metal can comprise, consist essentially of, or consist of elemental sodium metal. The elemental metal can comprise, consist essentially of, or consist of elemental potassium metal. The elemental metal can comprise, consist essentially of, or consist of elemental magnesium metal. The elemental metal can comprise, consist essentially of, or consist of elemental aluminum metal.

In some embodiments, at least one of the first electrode and the second electrode can include a dry electrode film comprising the elemental lithium metal and carbon particles. At least one of the first electrode and the second electrode may include an anode, such as an anode of a lithium ion battery or lithium ion capacitor.

In some embodiments, the carbon particles can include porous carbon particles, each porous carbon particle having a plurality of pores, where at least some of the plurality of pores receive at least some elemental lithium metal. In some embodiments, the porous carbon particles can include activated carbon. In some embodiments, the porous carbon particles can include hierarchically structured carbon. In some embodiments, the porous carbon particles can include mesoporous carbon.

In some embodiments, a solid electrolyte interface (SEI) layer covering exposed portions of the elemental lithium metal can be formed. The SEI layer may cover exposed portions of the elemental lithium metal that are below the exterior surface of the corresponding porous carbon particle.

In some embodiments, the carbon particles comprise graphite particles.

In some embodiments, the elemental lithium metal can include elemental lithium metal particles.

In some aspects, a method for fabricating an energy storage device can include combining elemental lithium metal and a plurality of carbon particles to form a first electrode film mixture, and forming an electrode film from the electrode film mixture.

In some embodiments, the method can further include forming a first electrode and a second electrode, where at least one of the first electrode and the second electrode includes the electrode film; and inserting a separator between the first electrode and the second electrode.

In some embodiments, the plurality of carbon particles can include a plurality of porous carbon particles, each porous carbon particle comprising a plurality of pores. In some embodiments, the porous carbon particles can include activated carbon. In some embodiments, the porous carbon particles can include hierarchically structured carbon. In some embodiments, the porous carbon particles can include mesoporous carbon.

In some embodiments, combining the elemental lithium metal and the plurality of carbon particles can include mixing the elemental lithium metal and the plurality of porous carbon particles such that at least some of the pores corresponding with each porous carbon particle receive at least some elemental lithium metal.

In some embodiments, a solid electrolyte interface (SEI) layer can be formed over exposed portions of the elemental lithium metal. Forming the SEI layer may include covering exposed portions of the elemental lithium metal that is below the exterior surface of the corresponding porous carbon particle. In some embodiments, forming the SEI layer includes exposing the exposed portions of the elemental lithium metal to an electrolyte solvent vapor. In some embodiments, exposing the exposed portions of the elemental lithium to an electrolyte solvent vapor includes exposing the exposed portions of the elemental lithium to a carbonate vapor.

In some embodiments, the plurality of carbon particles includes a plurality of graphite particles.

In some embodiments, the mixture is a substantially homogeneous mixture.

In some embodiments, further includes providing bulk elemental lithium metal, and reducing a size of the bulk elemental lithium metal to form a plurality of elemental lithium metal particles.

In some embodiments, combining the elemental lithium metal and the plurality of carbon particles includes combining dry elemental lithium metal and a plurality of dry carbon particles to form a dry electrode film mixture. In some embodiments, at least one of the first electrode and the second electrode includes an anode of a lithium ion battery or a lithium ion capacitor.

In some aspects, a mixture of bulk material for forming a lithium ion energy storage device can include elemental lithium metal, and active carbon particles.

In some embodiments, a mixing apparatus with an internal volume containing the bulk mixture comprising the elemental lithium metal, and active carbon particles is provided.

In some embodiments, the mixing apparatus further includes an inert gas within the internal volume. In some embodiments, the mixing apparatus further include an electrolyte solvent vapor within the chamber.

In some embodiments, the active carbon particles include graphite. In some embodiments, the active carbon particles include porous carbon particles, with pores into which the elemental lithium metal is inserted.

In some embodiments, a pre-doped energy storage device electrode can comprise a mixture of elemental metal, such as lithium, and active carbon particles.

In some embodiments, an energy storage device is provided, where in the energy storage device is fabricated by a process comprising combining elemental lithium metal and a plurality of carbon particles to form an electrode film mixture, and forming a first electrode film from the electrode film mixture. In further embodiments, the energy storage device is fabricated by further inserting a separator between the first electrode and a second electrode, and, optionally, placing the first electrode, the separator, and the second electrode in a housing, optionally, further adding an electrolyte to the housing, thus contacting the first electrode and the second electrode with the electrolyte, and, optionally, whereby the second electrode is pre-doped.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present disclosure are described with reference to the drawings of certain embodiments, which are intended to illustrate certain embodiments and not to limit the invention.

DETAILED DESCRIPTION

Figure 1:
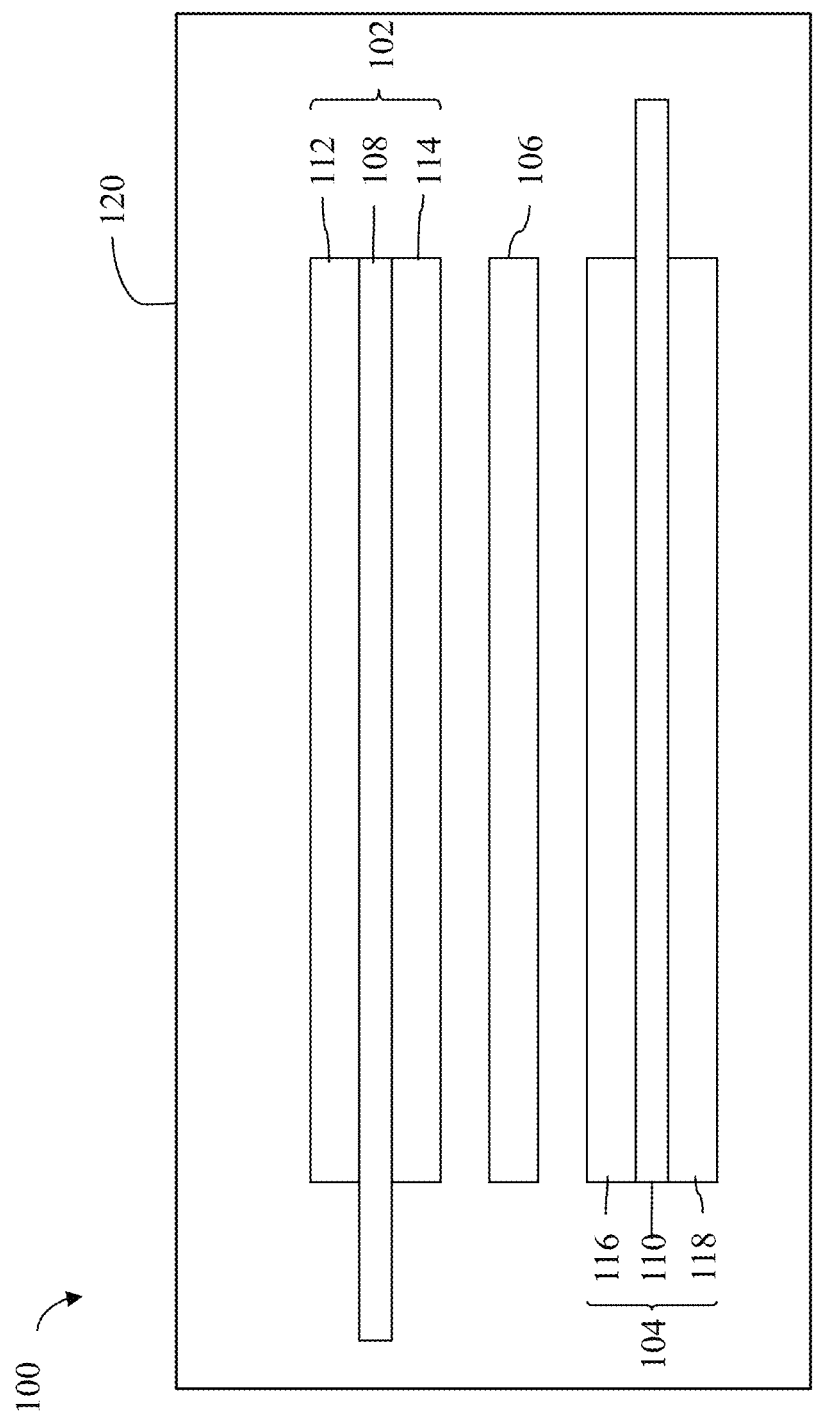
FIG. 1 is a schematic cross-sectional view of an energy storage device, according to an embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Described herein are embodiments of mixtures of materials, and corresponding electrodes, energy storage devices, and related processes which all use elemental lithium metal as a bulk material. As used herein, elemental lithium metal refers to lithium metal having an oxidation state of zero. Conventional energy storage device applications, including rechargeable energy storage applications, have not used elemental lithium metal as a raw material to disperse within the electrochemically active material formulation which is then converted into an electrode with finely distributed elemental lithium metal, as it can be reactive, or even explosive under some process conditions. For example, conventional wet energy storage device processes would not use elemental lithium metal, as it can be reactive or even explosive when exposed to many liquids inherent to the wet processes, such as water and/or N-methylpyrrolidone. Instead, conventional energy storage devices use lithium materials known to have a surface engineered coating layer to impart stability, and which do not have an oxidation state of zero, such as materials comprising lithium cations and carbonate based compositions. For example, conventional processes use Stable Lithium Metalized Powder, manufactured under the trademark SLMP by the company FLC Lithium. These conventional materials often include salt coatings, which are cracked to access the lithium in a secondary processing step, but which reduce the energy density of the electrodes formed from these materials, increase process complexity, and increase materials cost. The processes and structures of materials used herein allow for bulk elemental lithium metal to be used, which increases the energy density of the resulting energy storage device, and in a way that has reduced probability of undesired reactions or explosions.

By including an elemental metal in a mixture of electrode active materials, a pre-doped electrode can be fabricated. Without wishing to be limited by theory, it is thought that lithium metal included in an electrode film may undergo redox processes to create free metal ions. Thus, an electrode including an elemental metal as provided herein, when in contact with an electrolyte, may release an electron and subsequently form a metal cation per lithium metal atom. The released metal ions may diffuse to either electrode. For example, a typical anode material of an energy storage device generally will include one or more intercalating carbon components. The intercalating carbon components can be selected to intercalate certain metal ions, such as lithium ions. When an electrode includes an elemental metal as provided herein, the metal ions can intercalate in one or more active carbon components of an anode. Relatedly, cathode materials, for example, of capacitors, generally include carbon components capable of adsorbing metal ions, such as lithium ions. When a cathode is in contact with metal ions, the metal ions may adsorb to the surface of the cathode.

Thus, in some embodiments, the materials and methods provided herein may have the advantage of reducing the number of steps for pre-doping of an electrode. Specifically, when an elemental metal is included in an electrode film mixture, no discrete pre-doping step need be performed on a pre-existing electrode film. Electrode film mixtures provided herein may allow intimate contact between an elemental metal and a plurality of carbon particles. Thus, the need for a pre-doping step that requires a separate electrical element providing electrical contact between the pre-doping material source (which may a source of metal ions, such as an elemental metal or solution of metal ions) and the carbon-based electrode is removed. Instead, embodiments herein may provide a pre-doped electrode with an electrode film that has elemental metal particles, which release metal ions upon contact with electrolyte within an energy storage device.

Elemental metals may be less expensive than metal salts suitable as pre-doping sources. The materials and methods provided herein allow fabrication of pre-doped electrodes without the use of metal salts. Further, the materials and methods provided herein allow are compatible with dry electrode fabrication techniques, and accordingly reduce processing inefficiencies associated with wet electrode fabrication. Thus, in some embodiments, the materials and methods provided herein may increase the cost-effectiveness of fabrication of a pre-doped electrode. It will be understood that the elemental metal and related concepts described herein with respect to an energy storage device with lithium may be implemented with other energy storage devices, and other metals.

Bulk elemental lithium metal can be provided in elemental lithium metal sheets, bars, rods, or other forms. In some embodiments, bulk elemental lithium metal can be one or more elemental lithium metal pieces each having a volume greater than about 1 cubic millimeter ($mm^3$), including about 1 $mm^3$ to about 1 cubic meter ($m^3$). In some embodiments, bulk elemental lithium metal can refer to elemental lithium metal sheets having a thickness of about 5 microns (μm) to about 100 μm, including about 10 μm to about 80 μm, or about 50 μm to about 100 μm. Bulk elemental lithium metal can also refer to lithium chunks of various shapes. The bulk elemental lithium metal can be further reduced in size to particulate form, and mixed with carbon, such as, for example, carbon particles such as graphite particles, porous carbon particles, and/or activated carbon particles, to form a bulk material particulate mixture for forming an energy storage device electrode. In some embodiments, the elemental metal, for example lithium, is a powdered elemental metal. In further embodiments, the elemental metal, for example lithium, is reduced in size to form an elemental metal powder during one or more processing steps provided herein for example, one or more steps of process 300, 400, 500, or 600.

As used herein, carbon particles can refer to particles of carbon of various sizes, including porous carbon particles and/or nonporous carbon particles, such as graphite. In some embodiments, the carbon particles can have a particle size distribution D50 value of about 1 μm to about 20 μm. In some embodiments, the particle size distribution D50 value can be about 1 μm to about 15 μm, or about 2 μm to about 10 μm.

As used herein, porous carbon particles can refer to various carbon materials comprising pores or hollow channels extending therewithin. In some embodiments, the porous carbon particles can include nanoporous carbon particles, microporous carbon particles, mesoporous carbon particles, and/or macroporous carbon particles. The pores or hollow channels may have a diameter of about 1 nanometer (nm) to about 2 μm. In some embodiments, a porous carbon particle can have pores having a diameter which is about 2% to about 10% of the diameter of the particle, including about 2% to about 5%, or about 5% to about 10%. For example, pores of a porous carbon particle can occupy about 10% to about 80% of the volume of the carbon particle, including about 10% to about 60%, about 10% to about 50%, about 10% to about 40%.

In some embodiments, the porous carbon particles can include activated carbon particles. In some embodiments, the porous carbon particles can include hierarchically structured carbon particles. In some embodiments, the porous carbon particles can include structured carbon nanotubes, structured carbon nanowires and/or structured carbon nanosheets. In some embodiments, the porous carbon particles can include graphene sheets. In some embodiments, the porous carbon particles can be surface treated carbon particles. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

In one embodiment, a mixture for fabricating an electrode of an energy storage device comprises a plurality of carbon particles and elemental lithium metal, such as a plurality of elemental lithium metal particles. In some embodiments, the mixture is a dry particles mixture. In some embodiments, an electrode film for the electrode of the energy storage device electrode may comprise a dry particles mixture comprising the plurality of carbon particles and elemental lithium metal, and one or more other electrode components, such as binder. In some embodiments, a dry particles mixture comprising the plurality of carbon particles, elemental lithium metal, and one or more electrode components, can be formed into the electrode film using a dry process. As used herein, a dry process or a dry mixture refers to processes and mixtures free or substantially free of any liquids or solvents. For example, resulting electrode films formed from the dry particles mixture using the dry process may be substantially free of the residues from such liquids and/or solvents. In some embodiments, a wet process is used to form the electrode film, for example by forming a wet slurry solution. In some embodiments, the electrode may be an anode of a lithium ion battery or a lithium ion capacitor. For example, a lithium ion battery or a lithium ion capacitor may comprise a cathode, an anode and a separator between the cathode and the anode, the anode including the electrode film comprising the plurality of carbon particles and elemental lithium metal. In some embodiments, the elemental metal can comprise about 0.1 wt %, about 0.3 wt %, about 0.5 wt %, about 0.7 wt %, about 1 wt %, about 1.5 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, or about 10 wt % of the electrode film mixture. In certain embodiments, the elemental metal can comprise about 1 wt % to about 5 wt % of the electrode film mixture.

In some embodiments, the plurality of carbon particles and elemental lithium metal comprises a plurality of lithium-carbon composite particles. For example, a lithium-carbon composite particle may comprise an electrically conductive porous carbon particle and elemental lithium metal within pores or hollow channels of the porous carbon particle. In some embodiments, the elemental lithium metal within the pores comprises elemental lithium metal particles. In some embodiments, the elemental lithium metal within the pores comprises resolidified elemental lithium metal. The porous carbon particle may be a mesoporous carbon particle. In some embodiments, the porous carbon particle can be an activated carbon particle, or a hierarchically structured carbon particle. In some embodiments, the plurality of lithium-carbon composite particles comprises a plurality of porous carbon particles having pores at least some of which receive some elemental lithium metal. In some embodiments, the plurality of lithium-carbon composite particles comprises a plurality of porous carbon particles having pores filled or substantially filled with elemental lithium metal. As will be described in further details herein, in some embodiments, the plurality of lithium-carbon composite particles can be fabricated by combining the porous carbon particles and elemental lithium metal particles at a pressure lower than atmospheric pressure and at a temperature higher than room temperature. In some embodiments, the porous carbon particles and elemental lithium metal particles can be combined at approximately ambient temperature and atmospheric pressure. The porous carbon particles and elemental lithium particles can be mixed in inert conditions to form the plurality of lithium-carbon composite particles, for example, in a vessel, such as a mixing vessel, while being exposed only to inert gas, such as argon. In some embodiments, mixing the porous carbon particles and elemental lithium particles can comprise exposing the porous carbon particles and elemental lithium particles to carbonate vapor or carbonate liquid. In some embodiments, the plurality of lithium-carbon composite particles comprises a solid electrolyte interface (SEI) layer over elemental lithium metal within openings on exterior surfaces of the particles. In some embodiments, forming the SEI layer comprises exposing the plurality of lithium-carbon composite particles to a carbonate vapor. For example, exposed elemental lithium metal within openings of pores on exterior surfaces of the particles can react with the carbonate vapor such that the SEI layer is formed only or substantially only over the exposed elemental lithium metal. In further embodiments, the SEI layer may comprise reaction products of one or more carbonates, where the carbonates can be selected from ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. In still further embodiments, the SEI layer may comprise an electrically conductive polymer as provided herein.

In an alternative embodiment, the plurality of carbon particles and elemental lithium metal comprises a mixture comprising elemental lithium metal and graphite particles. In some embodiments, the elemental lithium metal comprises a plurality of elemental lithium metal particles. In some embodiments, the elemental lithium metal comprises an elemental lithium metal coating on one or more surfaces of at least some of the graphite particles. For example, the mixture may be a homogeneous or substantially homogeneous mixture comprising the graphite particles, and elemental lithium metal particles and/or elemental lithium metal coating on surfaces of the graphite particles. The mixture may be formed using bulk elemental lithium metal. For example, the bulk elemental lithium metal can be reduced in size to provide a plurality of elemental lithium metal particles of a desired size and/or a coating on surfaces of at least some of the graphite particles. In some embodiments, graphite particles and bulk elemental lithium metal are blended to reduce the size of the bulk elemental lithium metal and provide a mixture comprising the graphite particles and elemental lithium metal.

Provided herein are methods for fabricating pre-doped electrodes for use in energy storage devices. In some embodiments, a pre-lithiated electrode or electrode pre-doped with a desired quantity of lithium metal comprising one or more compositions described herein can demonstrate improve energy density performance. In some embodiments, an electrode comprising one or more compositions described herein can be configured to provide compensation for irreversible capacity loss exhibited by the energy storage device after a first charge and discharge cycle. For example, a quantity of elemental lithium metal that is added to porous carbon particles and/or combined with the graphite particles can be based on a desired degree of pre-lithiation or pre-doping, such as to provide desired compensation for irreversible capacity loss.

Also provided is an energy storage device in which both an anode and a cathode are pre-doped. In such embodiments, an anode and cathode may be pre-doped with metal ions without a discrete pre-doping step. For example, when an energy storage device includes a first electrode comprising an electrode film including an elemental metal as provided herein, and a second electrode, the second electrode may be pre-doped without a discrete pre-doping step. Specifically, when in contact with an electrolyte, the elemental metal in the first electrode may diffuse to the second electrode, providing a source of pre-doping ions for the second electrode. In some embodiments, a method of fabricating a pre-doped energy storage device may not include a discrete pre-doping step.

Although described primarily with reference to lithium metal, it will be understood that the apparatuses and/or processes described herein may also be applied to provide compositions comprising carbon and lithium, and/or one or more other metals. For example, the apparatuses and/or processes described herein may be applied to provide compositions comprising one or more of lithium, sodium, potassium, magnesium and aluminum. Embodiments can be implemented that include one or more of these metals in an "elemental" state as defined herein with respect to "elemental lithium metal."

In some embodiments, the electrode active material, such as carbon particles, and elemental metal can be combined with one or more other electrode film components to provide an electrode film mixture. The one or more other electrode film components can comprise a binder and/or one or more other electrode active components. In some embodiments, the binder can comprise a fibrillizable binder, including for example a fibrillizable polymer. In some embodiments, the binder comprises a fibrillizable fluoropolymer, such as polytetrafluoroethylene (PTFE). In some embodiments, the binder comprises PTFE, perfluoropolyolefin, polypropylene, a polyethylene, co-polymers thereof, and/or polymer blends thereof. In some embodiments, the electrode film mixture comprises a binder which consists of a single binder material, such as a fibrillizable fluoropolymer. For example, the electrode film mixture may have only a single binder material, the single binder material being, for example, PTFE. In some embodiments, the one or more other electrode active components can include hard carbon, soft carbon, graphene, mesoporous carbon, silicon, silicon oxides, tin, tin oxides, germanium, antimony, lithium titanate, titanium dioxide, mixtures, alloys, or composites of the aforementioned materials, and/or the like. In certain embodiments, an electrode film mixture consists essentially of elemental metal particles, carbon particles, and fibrillizable binder particles. In certain embodiments, an electrode film mixture consists of elemental metal particles, carbon particles, and fibrillizable binder particles.

FIG. 1 shows a side cross-sectional schematic view of an example of an energy storage device 100. In some embodiments, the energy storage device 100 can be an electrochemical device. In some embodiments, the energy storage device 100 can be a lithium, sodium, potassium, magnesium and/or aluminum based energy storage device. In some embodiments, the energy storage device 100 can be a lithium based battery, such as a lithium ion battery. In some embodiments, the energy storage device 100 can be a lithium based capacitor, such as a lithium ion capacitor. Of course, it should be realized that other energy storage devices are within the scope of the invention, and can include capacitor-battery hybrids, and/or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106.

The first electrode 102 may comprise a cathode and the second electrode 104 may comprise an anode, or vice versa. In some embodiments, the first electrode 102 may comprise a cathode of a lithium ion capacitor. In some embodiments, the first electrode 102 may comprise a cathode of a lithium ion capacitor and the second electrode 104 may comprise an anode of a lithium ion capacitor. In further embodiments, the first electrode 102 may comprise a cathode of a lithium ion battery and the second electrode 104 may comprise an anode of a lithium ion battery.

The energy storage device 100 may include an electrolyte 122 to facilitate ionic communication between the electrodes 102, 104 of the energy storage device 100. For example, the electrolyte 122 may be in contact with the first electrode 102, the second electrode 104 and the separator 106. The electrolyte 122, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte 122, such that the first electrode 102, the second electrode 104, the separator 106, and the electrolyte 122 may be physically sealed from an environment external to the housing 120.

The separator 106 can be configured to electrically insulate two electrodes separated by the separator. For example, the separator 106 may be configured to electrically insulate two electrodes positioned on opposing sides of the separator 106, such as the first electrode 102 and the second electrode 104, while permitting ionic communication between the two electrodes.

As shown in FIG. 1, the first electrode 102 and the second electrode 104 include a first current collector 108, and a second current collector 110, respectively. The first current collector 108 and the second current collector 110 may facilitate electrical coupling between the corresponding electrode and an external circuit (not shown).

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110), and a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104. The electrode films 112, 114, 116 and/or 118 can have a variety of suitable shapes, sizes, and/or thicknesses. For example, the electrode films can have a thickness of about 60 microns (μm) to about 1,000 microns, including about 80 microns to about 150 microns.

In some embodiments, an electrode film, such as an electrode film 112, 114, 116 and/or 118, described with reference to FIG. 1, may comprise a plurality of carbon particles and elemental lithium metal, including a plurality of elemental lithium metal particles as provided herein, such that the electrode film is pre-doped with lithium or pre-lithiated. In certain embodiments, a plurality of the electrode films 112, 114, 116 and 118 include, or are fabricated by a process including, an elemental metal and carbon mixture as provided herein.

In some embodiments, an electrode having an electrode film which includes a plurality of carbon particles and elemental lithium metal such that the electrode is pre-doped with a desired quantity of lithium, can provide an energy storage device having improved energy performance. For example, the electrode can be pre-doped to provide desired compensation for irreversible capacity loss occurring during a first charge and discharge of the energy storage device. In some embodiments, an electrode can include one or more electrode films comprising a quantity of the lithium-carbon composite particles or the mixture of graphite particles and elemental lithium metal particles such that the energy storage device can demonstrate a reduced irreversible capacity loss, as compared to energy storage devices which do not include pre-doped electrodes.

As described herein, in some embodiments, the plurality of carbon particles and elemental lithium metal particles comprises a plurality of lithium-carbon composite particles. In some embodiments, a lithium-carbon composite particle comprises a porous carbon particle comprising elemental lithium metal, such as a plurality of elemental lithium metal particles, in the pores of the porous carbon particle.

Elemental lithium metal portions that are exposed may be covered with a protective SEI layer to reduce the likelihood of undesired chemical reactions with the elemental lithium metal. The exposed portions of the elemental lithium metal described herein can be those portions that are exposed within the pores, but below the exterior surface of the corresponding porous carbon particle, or those portions that are exposed but approximately aligned with the exterior surface of the corresponding porous carbon particle, or portions of the lithium metal particles that protrude from the pore cavities, and from the exterior surface of each porous carbon particle. Thus, in some embodiments, the elemental lithium particles can each include two portions: un-exposed portions which are essentially protected through, for example, surface contact, or even sealing, within a carbon particle pore, and exposed portions, which may be within a pore, but without surface contact, and without being otherwise sealed or protected from external chemical reactions. Covering, for example, by formation of an SEI layer, the exposed portions of the elemental lithium metal particles can reduce the likelihood of undesired external chemical reactions. The SEI layer can be created by exposure of a elemental lithium-carbon particle mixture, or an elemental lithium-carbon composite particle mixture, to a carbonate vapor, as provided herein.

Figure 2A:
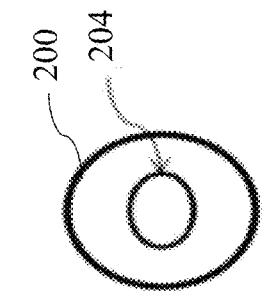
FIGS. 2A-2F are schematic diagrams of porous carbon particles, with or without elemental lithium metal in its pores, according to an embodiment.
Figure 2B:
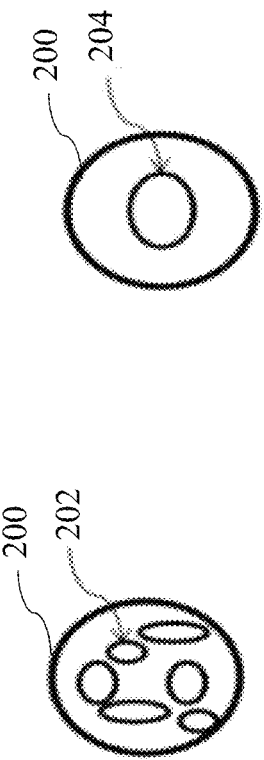
Figure 2C:
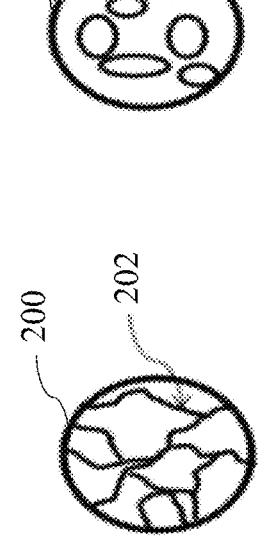
Figure 2D:
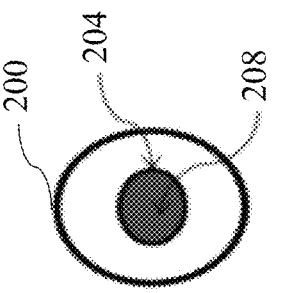
Figure 2E:
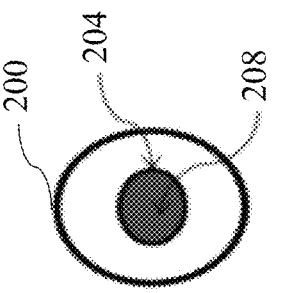
Figure 2F:
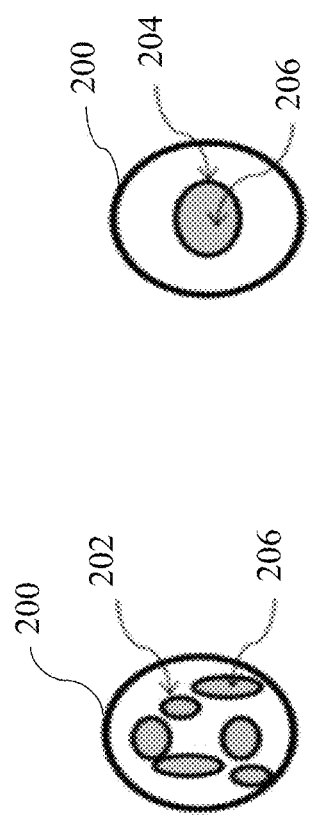

FIGS. 2A through 2F are schematic diagrams showing the incorporation of elemental lithium metal, such as elemental lithium metal particles, into the pores of a porous carbon particle, and subsequent formation of a solid electrolyte interface (SEI) layer covering exposed portions of the elemental lithium metal particles. Referring to FIG. 2A, a schematic cross-sectional view of an example of a porous carbon particle 200 is shown. As shown in FIG. 2A, the porous carbon can comprise a plurality of hollow channels or pores 202 extending therewithin. FIG. 2B is a schematic cross-sectional view of the porous carbon particle 200 at a higher magnification, showing a cross section view of some of the hollow channels or pores 202 extending within the porous carbon particle 200. FIG. 2C is a schematic diagram showing an opening 204 on an exterior surface of the porous carbon particle 200 corresponding to a hollow channel or pore 202 extending within the porous carbon particle 200. In FIG. 2D, a cross sectional view is shown of hollow channels or pores 202 within the porous carbon particle 200 comprising elemental lithium metal 206. For example, the elemental lithium metal 206 may comprise elemental lithium metal particles. For example, the hollow channels or pores 202 may be filled or substantially filled with elemental lithium metal 206. FIG. 2E shows an opening 204 on an exterior surface of the porous carbon particle 200 corresponding to a hollow channel or pore 202 extending within the particle 200, where the hollow channel or pore 202 comprises the elemental lithium metal 206. FIG. 2F is a schematic diagram showing an SEI layer 208 over the exposed lithium metal 206 within the opening 202 on the exterior surface of the porous carbon particle 200 shown in FIG. 2D.

In some embodiments, some portions of the elemental lithium metal may be ionized by one or more components on one or more pore surfaces, such as portions of the elemental lithium in contact with the pore surfaces. For example, some portions of the elemental lithium may be oxidized upon reaction with one or more components on the pore surfaces of the carbon particles and engage in electron transfer reactions, while remaining portions of the elemental lithium metal maintain an oxidation state of zero.

As discussed herein, porous carbon particles, such as those described with reference to FIGS. 2A-2F$_{[DK1]}$, can have a particle size distribution D50 value of about 1 μm to about 20 μm, including about 1 μm to about 15 μm or about 1 μm to about 10 μm. In some embodiments, a porous carbon particle can have pores with a diameter of about 2 nm to about 2 μm. In some embodiments, a porous carbon particle can have pores having a diameter about 2% to about 10% a diameter of the particles. In some embodiments, pores of a porous carbon particle can occupy about 10% to about 80% of the volume of the carbon particle. In some embodiments, the size of the elemental lithium particles can be selected based on a pore size of the porous carbon particles such that a desired amount of elemental lithium metal can be inserted into the pores of the porous carbon particles.

As will be described in further details herein, in some embodiments, the exposed portions of elemental lithium metal within openings on exterior surfaces of the corresponding porous carbon particles can be exposed to a carbonate vapor. The vapor can react with the exposed lithium metal to form a protective SEI layer covering the exposed elemental lithium metal portions. For example, a SEI layer can cover the elemental lithium metal portions that are exposed at the pore openings near or at the exterior surfaces of the porous carbon particles. The SEI layer may be formed due to reaction of the lithium metal with the carbonate vapor. In some embodiments, only a portion of the exterior surfaces of porous carbon particles are covered by the SEI layer, such as up to about 50%, about 40% or about 30%. In some embodiments, the SEI layer is formed only or substantially only over the exposed lithium metal, while the carbon portion of the exterior surfaces of the lithium-carbon composite particles are free or substantially free of the SEI layer. In some embodiments, the SEI layer may reduce or prevent further reaction of the lithium metal with the external environment while permitting electronic and ionic transport therethrough, facilitating access to the electrochemical energy of the lithium metal when the lithium-carbon particles are used as part of an electrode. The SEI layer may remain intact during subsequent handling of the lithium-carbon composite particles. Thus, the lithium-carbon composite particles allow elemental lithium metal to be used as a raw material, in wet or dry processes, while reducing the potential for undesirable reactions with the elemental lithium.

In alternative embodiments, the plurality of carbon particles and elemental lithium metal particles comprises a mixture comprising graphite particles and elemental lithium metal particles. As described in further details herein, the mixture comprising the graphite particles and elemental lithium metal particles can be prepared by combining graphite particles with bulk elemental lithium metal, and reducing the particle size of the bulk elemental lithium metal to provide a mixture comprising graphite particles and elemental lithium metal particles of a desired size. In some embodiments, the graphite particles and lithium metal particles form a homogeneous or substantially homogeneous mixture.

The graphite particles and bulk elemental lithium metal can be combined under similar process conditions as described with reference to the lithium carbon composite particles. The graphite particles and bulk elemental lithium metal can be mixed with binder in a dry process, and compressed to form a free standing film, without use of solvents or other liquids. Such embodiments can avoid the risk of reactive or explosive effects that would be inherent to using such constituents to form a film using a wet process.

As discussed herein, the bulk elemental lithium metal can have a volume of greater than about 1 mm$^3$. The bulk elemental lithium metal can be reduced in size to provide elemental lithium metal particles. In some embodiments, the elemental lithium metal particles can have a particle size distribution D50 value of about 0.5 µm to about 10 µm. In some embodiments, the elemental lithium metal particles can have a particle size distribution D50 value of about 1 µm to about 10 µm or about 1 µm to about 5 µm. For example, one or more pieces of bulk elemental lithium metal can be reduced in size from a volume of about 1 mm$^3$ to provide a plurality of elemental lithium particles having a particle size distribution D50 value of about 0.5 µm to about 10 µm, using one or more processes described herein. In some embodiments, the mixture comprising the graphite particles and the elemental lithium metal particles comprises graphite particles having a particle size distribution D50 value of about 1 µm to about 20 µm, and elemental lithium metal particles having a particle size distribution D50 value of about 0.5 µm to about 10 µm.

Methods

Figure 3:
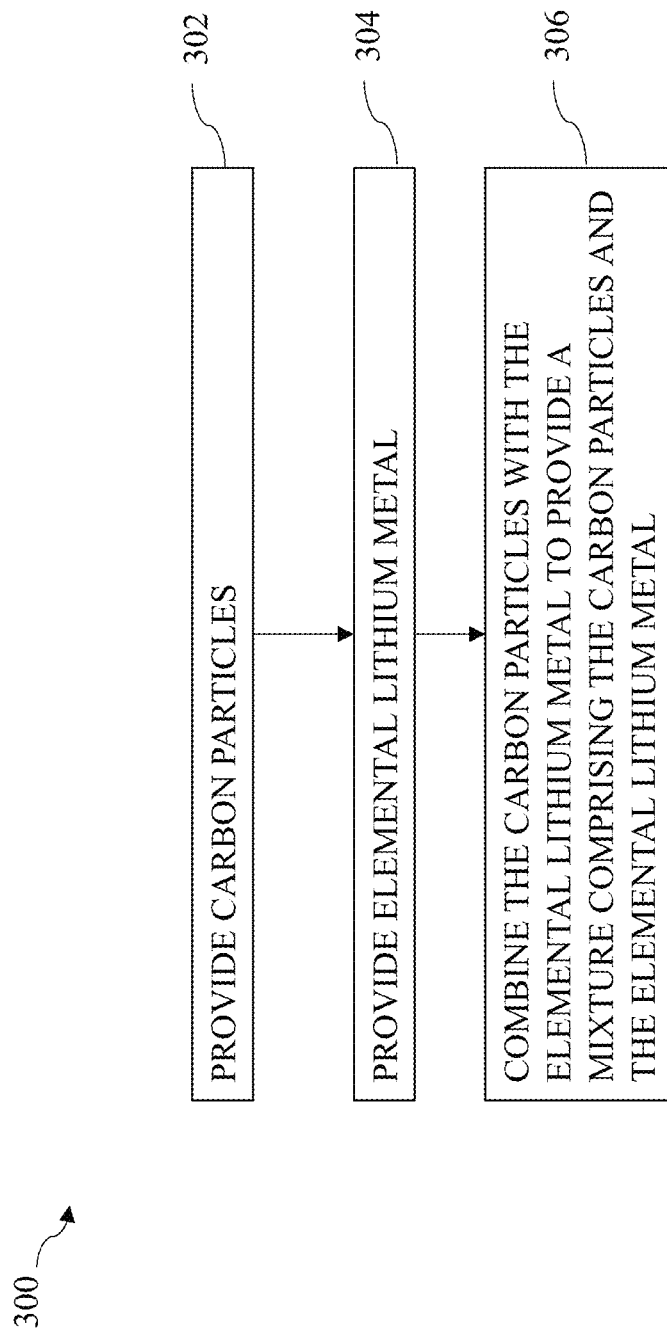
FIG. 3 is a process flow diagram of an example process for preparing a mixture comprising carbon particles and elemental lithium metal.

FIG. 3 shows an example process 300 for preparing a mixture comprising the plurality of carbon particles and elemental lithium metal. In some embodiments, a process for forming the plurality of lithium-carbon composite particles comprises process 300. In some embodiments, a process for forming the mixture comprising the plurality of graphite particles and plurality of elemental lithium metal particles comprises process 300. As shown in FIG. 3, in block 302, carbon particles can be provided. For example, the carbon particles can comprise porous carbon particles for preparing the lithium-carbon composite particles, or graphite particles for preparing the mixture comprising graphite and lithium metal.

In block 304, elemental lithium metal is provided. In some embodiments, lithium particles are provided for forming the lithium-carbon composite particles. In some embodiments, bulk elemental lithium metal is provided for preparing the mixture comprising graphite and lithium metal. In block 306, the carbon particles and the elemental lithium metal can be combined to provide a mixture comprising the plurality of carbon particles and elemental lithium metal. The mixture may comprise a dry particles mixture. For example, elemental lithium metal particles can be mixed with the porous carbon particles such that the elemental lithium metal particles can be inserted into the pores of the porous carbon particles to form the lithium-carbon composite particles. For example, bulk elemental lithium metal and graphite particles can be mixed such that the bulk elemental lithium metal can be reduced in size. In some embodiments, the bulk elemental lithium metal can be reduced to provide lithium metal particles of a desired size and to provide a mixture comprising lithium metal particles and graphite particles. In some embodiments, at least a portion of the bulk elemental lithium metal can melt during reducing the size of the bulk elemental lithium metal, and the molten lithium metal can form a coating on at least a portion of some of the graphite particles.

Process 300 can be performed at the temperatures, pressures, and/or inert conditions described elsewhere herein with respect to the processes for forming the lithium-carbon composite particles and/or processes for forming the lithium metal and graphite particle mixtures. In some embodiments, at least a portion of process 300 comprises use of a carbonate liquid or vapor. In some embodiments, at least a portion of process 300 can be performed under an atmosphere comprising carbonate vapor, and/or exposure of the carbon and elemental lithium metal to a carbonate liquid. For example, combining porous carbon particles and elemental lithium metal may be performed under an atmosphere comprising carbonate vapor, such as by exposing the porous carbon particles and elemental lithium metal to a carbonate vapor. For example, combining porous carbon particles and elemental lithium metal may comprise exposing the porous carbon particles and elemental lithium metal to a carbonate liquid. In some embodiments, exposure of molten elemental lithium metal to the carbonate vapor and/or carbonate liquid may facilitate a reduction in surface tension of the molten elemental lithium metal, for example thereby facilitating wettability of the molten elemental lithium metal, and flow the elemental lithium metal into pores of the porous carbon particles.

Figure 4:
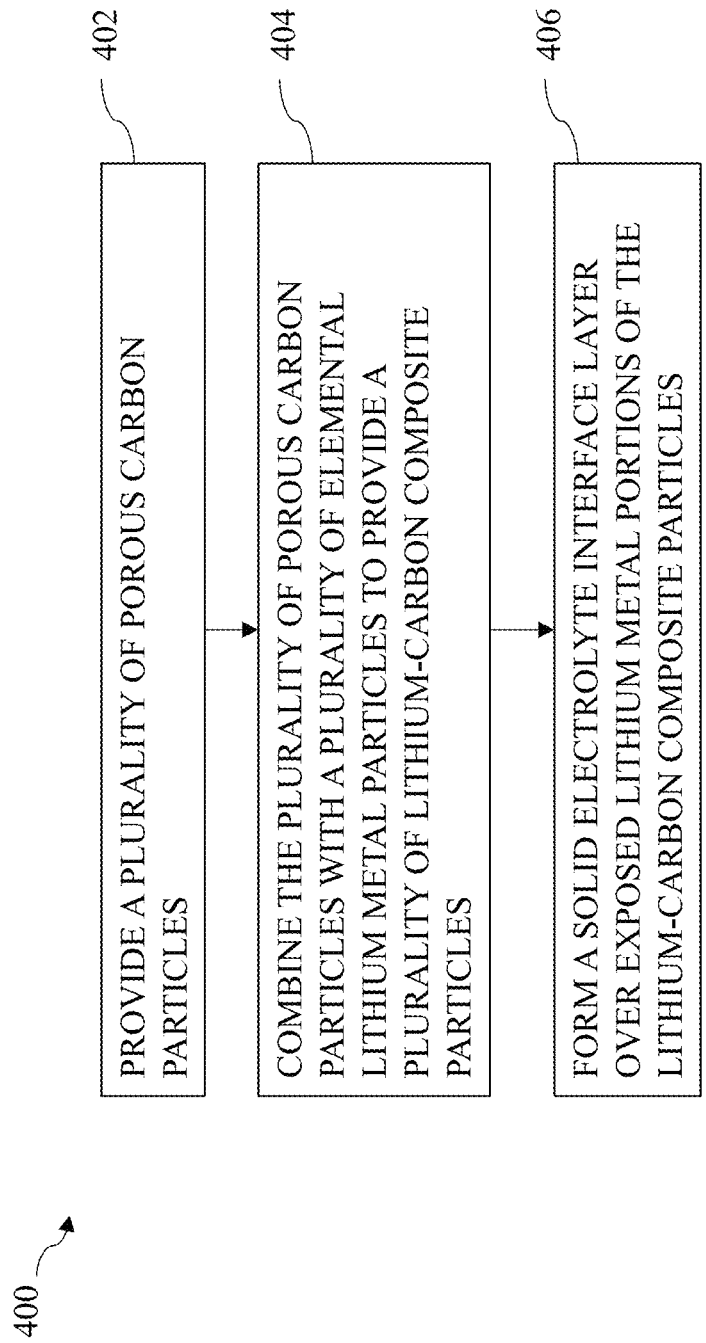
FIG. 4 is a process flow diagram of an example process for fabricating a plurality of lithium-carbon composite particles.

FIG. 4 shows an example of process 400 for fabricating a plurality of lithium-carbon composite particles. In block 402, a plurality of porous carbon particles can be provided. As described herein, in some embodiments, the porous carbon particles are electrically conductive carbon particles. In some embodiments, the plurality of porous carbon particles can comprise one or more of activated carbon particles and/or hierarchically structured carbon particles. In some embodiments, the plurality of porous carbon particles can comprise structured carbon nanotubes, structured carbon nanowires and/or structured carbon nanosheets. In some embodiments, the plurality of porous carbon particles can comprise graphene sheets. In some embodiments, the plurality of porous carbon particles is mesoporous. In some embodiments, the plurality of porous carbon particles consists or consists essentially of activated carbon particles. In some embodiments, the plurality of porous carbon particles consists or consists essentially of mesoporous particles. In some embodiments, the plurality of porous carbon particles consists or consists essentially of hierarchically structured carbon particles. In some embodiments, the porous carbon particles can be surface treated carbon particles, or other carbon particle types as described elsewhere herein.

In block 404, the plurality of porous carbon particles can be combined with a plurality of elemental lithium metal particles to provide a plurality of lithium-carbon composite particles, where the plurality of lithium-carbon composite particles comprises the plurality of porous carbon particles having elemental lithium metal in its pores. In some embodiments, at least some of the pores within the plurality of porous carbon particles comprise elemental lithium metal. In some embodiments, at least some of the pores are filled or substantially filled with elemental lithium metal. In some embodiments, all or substantially all of the pores are filled or substantially filled with elemental lithium metal. In some embodiments, the elemental lithium metal within the pores of the porous carbon particles comprises elemental lithium metal particles.

In some embodiments, the porous carbon particles and elemental lithium metal particles can be combined within a mixing chamber of a mixing apparatus such that elemental lithium metal can be inserted into the pores of the porous carbon particles. In some embodiments, the elemental lithium metal particles are inserted into the pores. In some embodiments, the elemental lithium metal particles are at least partially melted during the mixing process such that the molten elemental lithium metal enters the pores within the porous carbon particles, for example due to capillary action, and/or lower pressure or vacuum within the mixing chamber. For example, the molten elemental lithium metal may solidify once within the pores after the porous carbon particle cools. In some embodiments, the pores may comprise elemental lithium metal particles and/or resolidified elemental lithium metal. For example, the pores may be filled or substantially filled with elemental lithium metal particles and/or resolidified elemental lithium metal.

In some embodiments, combining the plurality of porous carbon particles and the plurality of elemental lithium metal particles comprises use of a carbonate liquid or vapor. For example, liquid carbonate or carbonate vapor may be supplied to the mixing apparatus. In some embodiments, combining the plurality of porous carbon particles and the plurality of elemental lithium metal particles can be performed under an atmosphere comprising carbonate vapor, or include exposure of the carbon and elemental lithium metal to a carbonate liquid. As described herein, exposure to the carbonate vapor or carbonate liquid may facilitate a reduction in surface tension of molten elemental lithium metal, for example thereby facilitating wettability of the molten elemental lithium metal, and flow the elemental lithium metal into pores of the porous carbon particles. In some embodiments, the carbonate vapor and carbonate liquid may comprise one or more of ethylene carbonate (EC), dimethyl carbonate (DMC), diethyl carbonate (DEC), ethyl methyl carbonate (EMC), vinyl carbonate (VC), propylene carbonate (PC), and/or the like.

In some embodiments, apparatuses configured to provide desired mixing of the elemental lithium particles and porous carbon particles comprise ribbon mixer, rotary mixer, planetary mixers, high shear blender, ball mill, hammer mill, jet mill, acoustic mixer, microwave mixer and/or fluidized bed mixer.

In some embodiments, a size of the elemental lithium metal particles can be selected based on a pore size of the porous carbon material. For example, a particle size of the elemental lithium metal particles can be selected to facilitate insertion of a desired quantity of lithium metal particles into the pores of the porous carbon particles. In some embodiments, pores of the porous carbon particles can be filled or substantially filled with lithium metal particles. An example porous carbon particle would comprise pores with an average diameter that is about 1/50 to 1/10 the size of the average carbon particle diameter, with branching inner particle porous network that occupies about 10% to about 80% of the volume of the carbon particle. Corresponding elemental lithium metal particles can be selected to have a size such that the greatest outer diameter is sufficiently small to fit into the carbon particle pores. In some embodiments, elemental lithium metal particles are selected to have an average diameter less than the average pore size of a plurality of porous carbon particles.

In some embodiments, the porous carbon particles and elemental lithium metal particles can be combined under a pressure lower than atmospheric pressure. For example, the porous carbon particles and elemental lithium metal particles can be provided into an internal volume of a mixing chamber of the apparatus and mixed under a pressure of about $1\times10^{-8}$ Pascals to about $1\times10^{5}$ Pascals. In some embodiments, the porous carbon particles and elemental lithium metal particles can be mixed at a temperature greater than room temperature, such as a temperature greater than about 20° C. In some embodiments, the temperature can be 20° C. to 200° C., including 50° C. to 180° C. In some embodiments, combining the porous carbon particles and elemental lithium metal particles under a pressure lower than atmospheric pressure and at a temperature higher than room temperature facilitates insertion of the lithium metal particles into the porous carbon particles.

In some embodiments, a gas, such as an inert gas, can be provided to the mixing chamber during mixing of the carbon particles and lithium metal particles. The inert gas may comprise a noble gas, such as argon. In some embodiments, inert gas is flowed into the mixing chamber to facilitate insertion of lithium metal into the pores of the porous carbon particles. In some embodiments, the inert gas can be flowed during at least a portion of the mixing step. In some embodiments, flow of the inert gas can be initiated after mixing of the porous carbon particles and lithium metal particles has initiated. In some embodiments, inert gas is flowed into the reaction chamber only during a second half of the mixing step, such as during the last about 40%, about 30%, about 20%, about 10% or about 5% of the mixing step. In some embodiments, the inert gas can be flowed for the entire or substantially the entire duration of the mixing step. The duration of inert gas flow can be selected to provide desired insertion of the lithium metal particles into pores of the porous carbon particles.

In block 406, a solid electrolyte interface (SEI) layer can be formed over the exposed lithium metal portions of the lithium-carbon composite particles. For example, the SEI layer may be formed over exposed portions of the elemental lithium metal that is below the exterior surface of the corresponding porous carbon particle. The SEI layer can reduce or prevent exposure of the portions of lithium metal to components of the external environment which may degrade the lithium metal, such as oxygen and/or water, while permitting for ionic and/or electronic transport therethrough. In some embodiments, forming the SEI layer comprises exposing the lithium-carbon composite particles to a vapor comprising one or more vaporized energy storage device electrolyte solvents. In some embodiments, the vapor comprises a carbonate vapor. In some embodiments, the carbonate vapor comprises ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like.

In some embodiments, other protective coatings can be formed over exposed portions of the lithium metal, including electrically conductive polymeric coatings. In some embodiments, an electrically conductive polymeric coating can be formed over exposed lithium metal portions through polymerization of low vapor pressure monomers. For example, a polymeric coating comprising polypyrrole can be generated using pyrrole as the monomeric precursor. In some embodiments, the polymer coating can comprise polythiophene, polyfuran, polyaniline, polyacetylene, combinations thereof, and/or the like.

In some embodiments, the lithium-carbon composite particles can be exposed to the carbonate vapor after a desired quantity of lithium metal has been inserted into the porous carbon particles. In some embodiments, the lithium-carbon composite particles can be exposed to the carbonate vapor in the mixing chamber, for example, to an internal volume formed by the mixing chamber. The carbonate containing solvent may be vaporized and provided to the mixing chamber after a period of mixing such that the vapor can react with the exposed portions of the lithium metal to form the SEI layer. In some embodiments, the lithium-carbon particles can be transported to a different chamber in which the particles are then exposed to the carbonate vapor. Exposing the lithium-carbon composite particles to carbonate vapor may be conducted under various temperatures and pressures regimes in which the carbonate can remain in or substantially in gaseous phase such that the gaseous phase carbonate vapor can react with the lithium metal. In some embodiments, the pressure of the interior volume can be maintained at a level below the vaporization pressure of a carbonate or mixture of carbonates at the temperature of the internal volume.

As described herein, in some embodiments, exposure to the carbonate vapor may be performed during combining of the plurality of porous carbon particles and elemental lithium metal and continued during formation of the SEI layer. For example, exposure to the carbonate vapor may be performed both to facilitate insertion of the lithium metal into the pores of the carbon particles, as well as the formation of the SEI layer.

In some embodiments, the carbonate containing vapor may react only or substantially only with the elemental lithium metal such that the SEI layer forms only or substantially only over the exposed elemental lithium metal, while leaving the carbon portions of the exterior surfaces of the lithium-carbon composite materials free or substantially free of the SEI layer. In some embodiments, the SEI layer can protect the exposed lithium metal, facilitating subsequent handling of the lithium-carbon composite particles and/or fabrication of electrode films and/or electrode film mixtures comprising the lithium-carbon composite particles. In some embodiments, the SEI layer can reduce or prevent further reaction of the lithium metal with external environments, while permitting both ionic and electronic transport therethrough. Ionic and electronic transport across the SEI layer can permit access to the electrically conductive lithium metal within the porous carbon particle during operation of the energy storage device, facilitating access to electrical energy from the lithium without having to first break apart or crack open the porous carbon particle. In some embodiments, the SEI layer reduces or prevents reaction of the otherwise exposed lithium metal with liquids, facilitating use of such lithium-carbon composite particles in dry or wet electrode fabrication processes, such as processes comprising a slurry solution.

Figure 5:
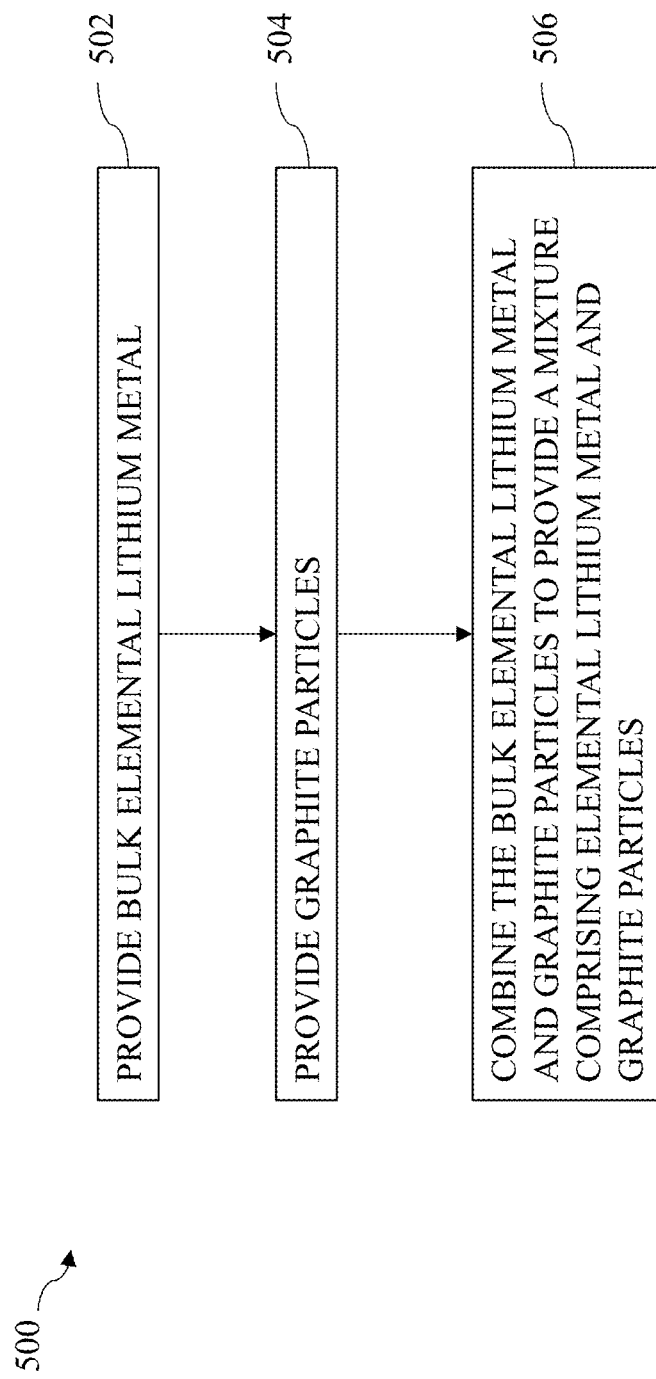
FIG. 5 is a process flow diagram of an example process for preparing a mixture comprising graphite particles and elemental lithium metal.

Referring to FIG. 5, a process 500 for preparing a mixture using bulk elemental lithium metal and graphite is provided. In block 502, bulk elemental lithium metal can be provided. As described herein, bulk elemental lithium metal can include sheets and/or chunks of elemental lithium metal, or other bulk metal forms. In block 504, graphite particles can be provided. In block 506, the bulk elemental lithium metal and the graphite particles can be combined to provide a mixture comprising elemental lithium metal and graphite particles.

In some embodiments, combining the bulk elemental lithium metal and the graphite particles comprises reducing a size of the bulk elemental lithium metal. In some embodiments, the combining step may be configured to both reduce the bulk elemental lithium metal in size to elemental lithium particles having a desired size and provide a homogeneous or substantially homogeneous mixture comprising the elemental lithium metal particles and the graphite particles. In some embodiments, at least a portion of the elemental lithium metal can melt during reducing the size of the bulk elemental lithium metal such that the molten lithium metal forms a coating over at least a portion of some of the graphite particles. In some embodiments, the mixture comprising the graphite particles and elemental lithium metal comprises the graphite particles and a plurality of elemental lithium metal particles and/or elemental lithium coating on surfaces of at least some of the graphite particles. For example, the mixture may comprise a homogeneous or substantially homogeneous mixture comprising the graphite particles, and elemental lithium metal particles and/or elemental lithium metal coating on one or more surfaces of at least some of the graphite particles.

In some embodiments, combining the bulk elemental lithium metal and the graphite particles comprises blending the bulk elemental lithium metal and the graphite particles. In some embodiments, a Waning® blender can be used. In some embodiments, conditions under which the bulk elemental lithium metal and the graphite particles are blended can be selected to provide a lithium metal particle size and a homogenous or substantially homogeneous mixture. In some embodiments, conditions of the mixing process can be adjusted using one or more of the following parameters: duration of the mixing process, magnitude of the applied shear force, mixing process temperature, mixing blades and/or paddles tip speed, mixer type, atmosphere provided within the mixing chamber, the sequence in which materials are introduced into the mixing chamber and/or the quantity of materials introduced into the mixing chamber.

In some embodiments, materials other than, or in addition, to graphite can be combined with bulk elemental lithium metal. For example, one or more other electrode film materials can be combined with bulk elemental lithium metal to provide a homogeneous or substantially homogeneous mixture comprising elemental lithium metal particles comprising a desired size. In some embodiments, the one or more other materials can include silicon, silicon oxide, tin, tin oxide, carbon composite comprising carbon, silicon and tin, combinations thereof, and/or the like.

In some embodiments, the mixture comprising the graphite particles and lithium metal particles can be used directly in a dry fabrication process for forming a dry particles electrode film. In some embodiments, the mixture comprising the graphite particles and elemental lithium metal can be subsequently treated to provide a SEI layer around the lithium metal particles, for example reducing or preventing further reaction of the lithium metal with the external environment. In some embodiments, one or more processes for forming SEI layers described with reference to FIG. 4 can be applied. For example, the mixture may be exposed to a vaporized electrolyte solvent, such as a carbonate vapor. In some embodiments, the carbonate vapor can have one or more compositions as described herein. In some embodiments, such a treatment may facilitate use of the lithium metal in wet processes, such as in wet slurry processes for forming electrode films.

Figure 6:
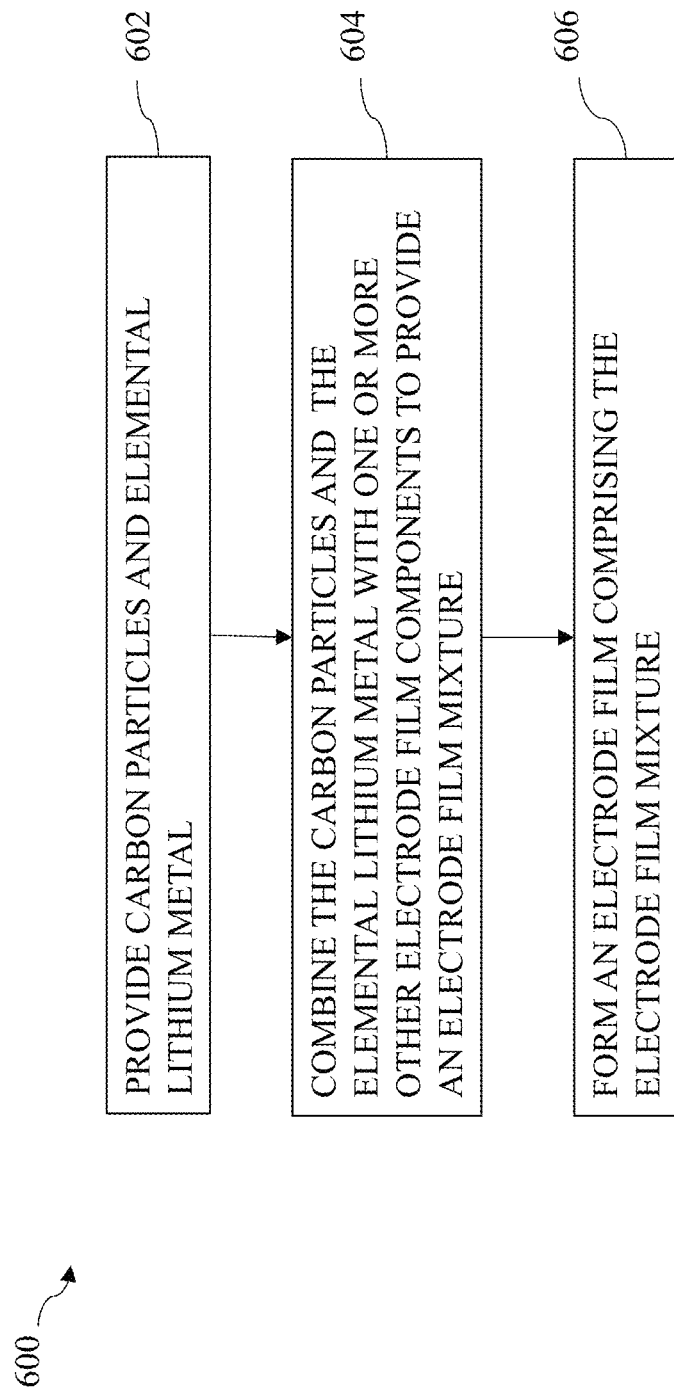
FIG. 6 is a process flow diagram of an example process for fabricating an electrode film using one or more of the compositions described herein.

FIG. 6 shows an example of a dry process 600 for fabricating an energy storage device electrode film comprising carbon particles and elemental lithium metal. For example, the electrode film may comprise a plurality of lithium-carbon composite particles or a mixture comprising graphite particles and elemental lithium metal. In some embodiments, the electrode can be an electrode of the energy storage device 100 described with reference to FIG. 1. In some embodiments, the electrode comprises an anode of a lithium ion battery. In some embodiments, the electrode comprises an anode of a lithium ion capacitor.

In block 602, carbon particles and elemental lithium metal can be provided. In some embodiments, providing the elemental lithium metal and carbon particles comprises providing a plurality of lithium-carbon composite particles. In some embodiments, providing the elemental lithium metal and carbon particles comprises providing a mixture comprising elemental lithium metal and graphite particles. In some embodiments, the plurality of lithium-carbon composite particles and/or the mixture comprising elemental lithium particles and graphite particles can be fabricated according one or more processes described herein. In some embodiments, block 602 comprises the step(s) described for block 302, block 304, block 402, and/or block 502.

In block 604, the carbon particles and elemental lithium metal can be combined with one or more other electrode film components to provide an electrode film mixture. In some embodiments, the one or more other electrode film components comprises a binder and/or one or more other electrode active components. In some embodiments, the binder can comprise a fibrillizable binder, including for example a fibrillizable polymer. In some embodiments, the binder comprises a fibrillizable fluoropolymer, such as polytetrafluoroethylene (PTFE). In some embodiments, the binder comprises PTFE, perfluoropolyolefin, polypropylene, a polyethylene, co-polymers thereof, and/or polymer blends thereof. In some embodiments, the electrode film mixture comprises a binder which consists of a single binder material, such as a fibrillizable fluoropolymer. For example, the electrode film mixture may have only a single binder material, the single binder material being PTFE. In some embodiments, the one or more other electrode active components comprises hard carbon, soft carbon, graphene, mesoporous carbon, silicon, silicon oxides, tin, tin oxides, germanium, lithium titanate, titanium dioxide, mixtures or composites of the aforementioned materials, and/or the like. In some embodiments, block 604 comprises the step(s) described for block 306, block 404, block 406, and/or block 506. In certain embodiments, block 604 comprises the step(s) of block 406. Thus, in some embodiments, block 604 comprises the step of forming an SEI layer, comprising exposing the lithium-carbon composite particles to a vapor comprising one or more vaporized energy storage device electrolyte solvents.

In some embodiments, the combining step of block 604 is a dry process. For example, the elemental lithium metal particles and carbon particles can be combined with one or more other electrode film components in a dry process, or a process free or substantially free of solvents or additives, to provide a dry particles electrode film mixture. In some embodiments, the plurality of lithium-carbon composite particles or the mixture comprising the elemental lithium metal particles and graphite particles can be combined with the one or more other components of an energy storage device electrode in a dry mixing process to provide a dry particles electrode film mixture. Thus, in some embodiments, block 604 can include the step of combining elemental lithium metal particles and carbon particles with a fibrillizable binder.

In block 606, an electrode film comprising the electrode film mixture can be formed. For example, the electrode film may be a film for an anode of a lithium ion battery or a lithium ion capacitor. In some embodiments, the electrode film mixture comprises a fibrillizable binder, and forming the electrode film comprises a fibrillization process in which a matrix, lattice and/or web of fibrils can be formed from the fibrillizable binder, to provide structural support for other components of the electrode film. For example, the binder material in the electrode film mixture can be fibrillized such that a free-standing dry particles electrode film can be formed from the electrode film mixture. In some embodiments, shear force can be applied upon the binder material to form the fibrils, such as through a blending process. For example, a milling process can be used, including a jet-mill process.

In certain embodiments, a free-standing electrode film consists essentially of elemental metal particles, carbon particles, and fibrillized binder particles. In certain embodiments, a free-standing electrode film consists of elemental metal particles, carbon particles, and fibrillized binder particles. In further embodiments, the elemental metal particles and carbon particles are composite particles as provided herein.

In some embodiments, a wet process for fabricating an energy storage device electrode can be used to form the electrode film. In some embodiments, wet processes for fabricating an energy storage device electrode can include preparing a liquid solution and/or suspension comprising one or more electrode components, including electrode active components, and forming an electrode film using the liquid solution and/or suspension. In some embodiments, forming an electrode using the liquid solution comprises one or more of slot-die coating, gravure coating, reverse roll coating, knife-over-roll coating, metering rod coating, curtain coating and/or dip coating.

In some embodiments, an electrode, such as an electrode of a lithium ion battery or a lithium ion capacitor, comprises one or more of the electrode films fabricated according to one or more of processes 300, 400, 500 and/or 600. For example, the electrode may comprise one or more of the electrode films coupled to a current collector. For example, the electrode may comprise a respective electrode film coupled to opposing surfaces of the current collector. In some embodiments, a dry particles electrode film can be bonded to a surface of the current collector, including directly bonded to the current collector, such as through a lamination process. In some embodiments, an intervening adhesive layer can be used to facilitate bonding of the electrode film to the current collector. Thus, methods for fabricating a pre-doped electrode for use in an energy storage device, including one or more of processes 300, 400, 500 and/or 600, are provided. For example, an energy storage device can be fabricated by a method comprising providing carbon particles, providing elemental metal, and combining the carbon particles with the elemental lithium metal to provide a mixture comprising the carbon particles and the elemental lithium metal, as described with respect to process 300; by a method comprising providing a plurality of porous carbon particles, combining the plurality of porous carbon particles with a plurality of elemental lithium metal particles to provide a plurality of lithium-carbon composite particles, and forming a solid electrolyte interface layer over exposed lithium metal portions of the lithium-carbon composite particles, as described with respect to process 400; by a method comprising providing bulk elemental lithium metal, providing graphite particles, and combining the bulk elemental lithium metal and graphite particles to provide a mixture comprising elemental lithium metal and graphite particles, as described with respect to process 500; and/or by a method comprising providing carbon particles and elemental lithium metal, combining the carbon particles and the elemental lithium metal with one or more other electrode film components to provide an electrode film mixture, and forming an electrode film comprising the electrode film mixture, as described with respect to process 600.

In some embodiments, an energy storage device can be fabricated using one or more electrode films described herein. For example, an electrode of the energy storage device can comprise one or more electrode film described herein. In some embodiments, the energy storage device may comprise an external housing. The electrode comprising the one or more electrode films can be inserted into an interior volume of the housing. In some embodiments, one or more other electrodes and/or one or more separators may be inserted into the interior volume. Subsequently, the housing may be sealed after a desired quantity of electrolyte has been introduced into the housing of the energy storage device.

Figure 7:
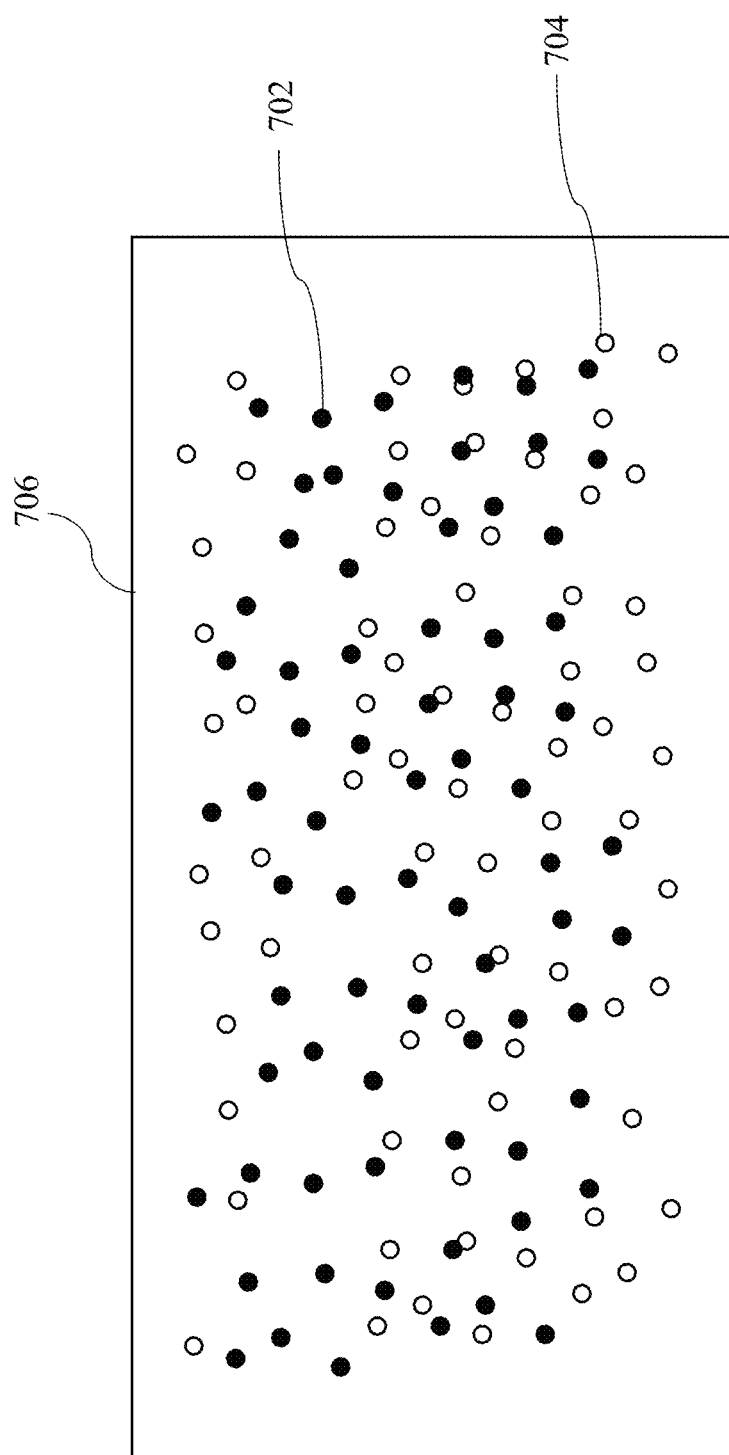
FIG. 7 is a schematic diagram of an example apparatus configured to combine elemental lithium metal and carbon particles according to one or more processes described herein.

FIG. 7 is a schematic diagram of an example of an apparatus 700 configured to prepare one or more compositions described herein. For example, the apparatus 700 may comprise a mixing apparatus configured to produce bulk material for use in fabricating energy storage device electrodes, such as electrodes described with reference to FIG. 1. As shown in FIG. 7, carbon particles 702 and elemental lithium metal 704 may be provided into an interior volume of a mixing chamber 706 of the apparatus 700 such that the carbon particles 702 and the elemental lithium metal 704 may be combined according to one or more processes described herein. The apparatus 700 may be configured to provide a plurality of lithium-carbon composite particles or a mixture comprising graphite particles and elemental lithium metal, according to one or more processes described herein. For example, the apparatus 700 may be configured to combine the carbon particles 702 and the elemental lithium metal 704 according to the process described with reference to FIGS. 3 through 6, to provide lithium-carbon composite particles comprising lithium metal within pores of the corresponding porous carbon particles, or mixtures comprising graphite particles and lithium metal, including elemental lithium metal particles and/or elemental lithium metal coating on at least some of the surfaces of the graphite particles. In some embodiments, apparatus 700 may comprise a ribbon mixer, rotary mixer, planetary mixers, high shear blender, ball mill, hammer mill, jet mill, acoustic mixer, microwave mixer and/or fluidized bed mixer.

Example 1

Figure 8A:
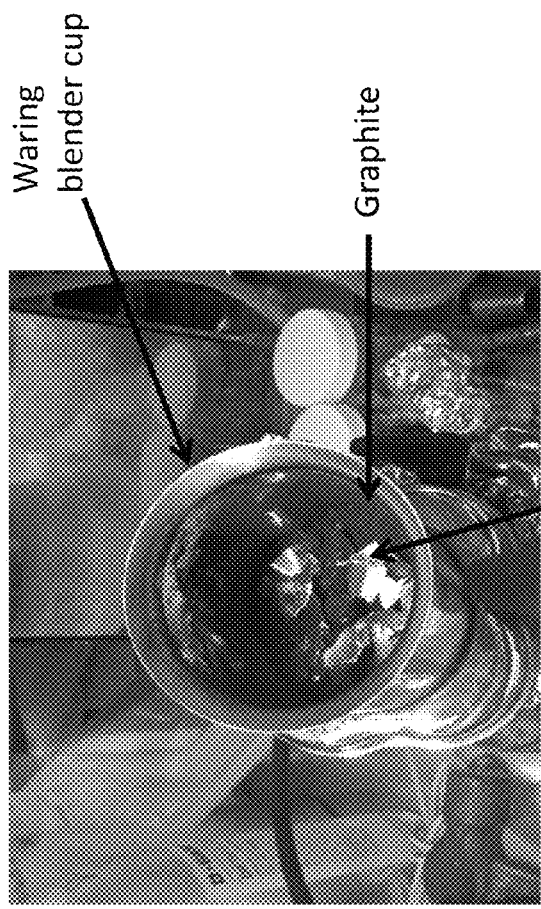
FIGS. 8A-8C are photos showing various stages in a process for forming an electrode film mixture from bulk elemental lithium metal and graphite particles, according to an embodiment.
Figure 8B:
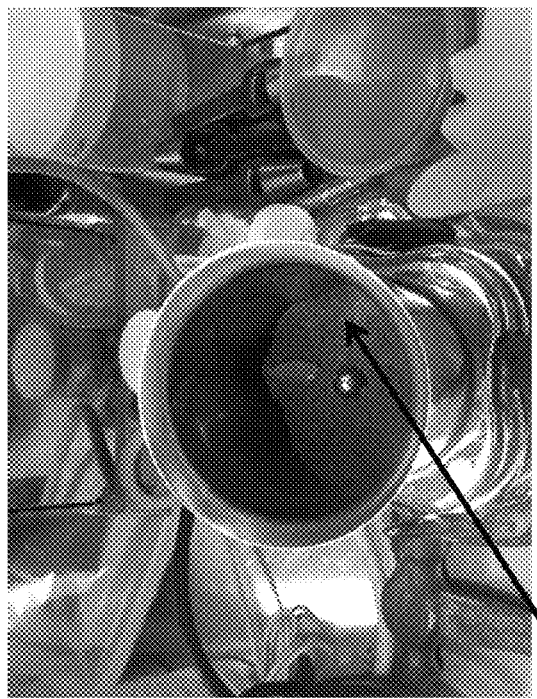
Figure 8C:
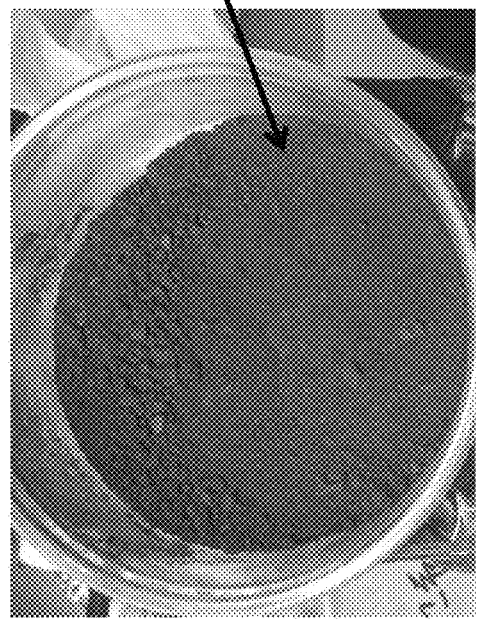

FIGS. 8A through 8C are photos showing various steps in a process for preparing a dry particles mixture from bulk elemental lithium metal, according to an embodiment. FIG. 8A shows graphite particles and lithium metal sheets in a mixing chamber of a mixing apparatus (e.g., a Warning® blender). In the example shown, about 23.3 grams of graphite powder and about 0.68 grams of bulk elemental lithium metal are combined in the blender. The graphite powder and lithium metal were blended about 36 times at about 5-second pulse intervals. In FIG. 8C, about 1.7 grams of PTFE were added to the blended mixture comprising graphite powder and lithium metal. The PTFE, graphite powder and lithium metal were blended about 24 times at about 5-second pulse intervals to provide an electrode film mixture comprising the PTFE, graphite powder and lithium metal.

Figure 9A:
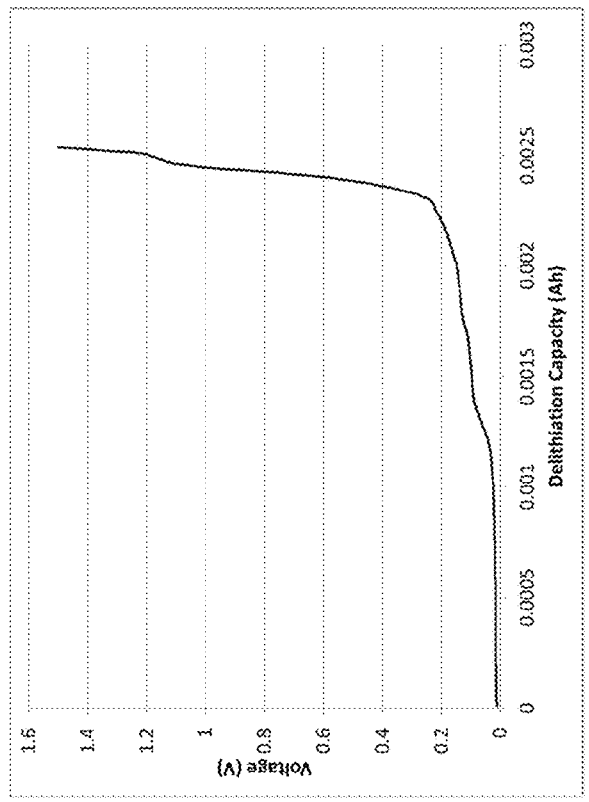
FIGS. 9A-9B are voltage curves showing the specific capacity performance of coin cells comprising electrode films formed according to Example 1.
Figure 9B:
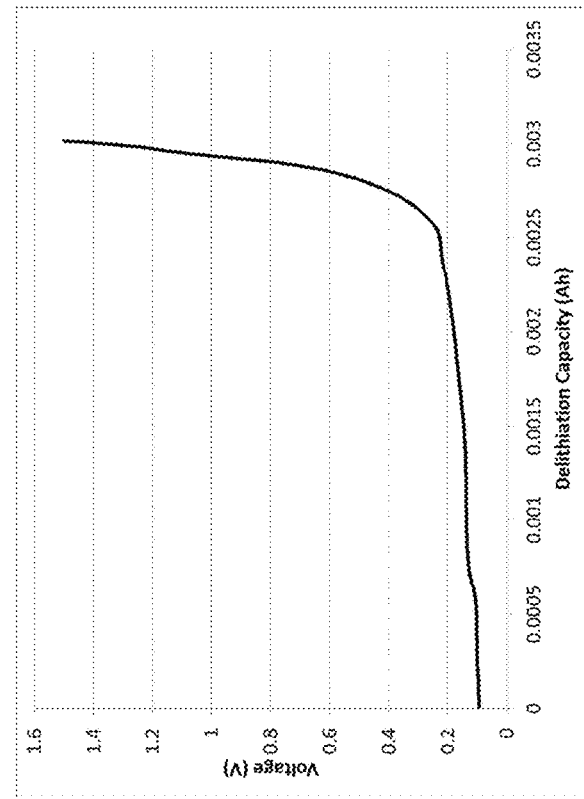

FIGS. 9A and 9B are graphs showing electrochemical performance of two coin half-cells comprising a free-standing electrode film formed using the mixture comprising the PTFE, graphite powder and lithium metal according to Example 1. The half-cells further included a lithium metal counter electrode, a polyolefin separator, and an electrolyte comprising $LiPF_6$ in carbonate based solvent. FIGS. 9A and 9B show the voltage profile of the coin half-cells after the first delithiation step without any prior galvanostatic lithiation step. The graphs of FIGS. 9A and 9B show voltage in Volts (V) on the y-axis and delithiation capacity on the x-axis in ampere-hours (Ah). These voltage curves offer an estimate as to the quantity of lithium metal which is electrochemically available in the electrodes of the devices, for example in the free-standing electrode film formed using the mixture comprising the PTFE, graphite powder and lithium metal. The coin half-cell corresponding to FIG. 9A provided about 2.5 milliampere hour of capacity at a 1.5 volts cutoff voltage, while the coin half-cell corresponding to FIG. 9B provided about 3 milliampere hour of capacity at the same cutoff voltage.

The amount of the delithiation capacity can depend on the amount of lithium metal that is electrochemically available in the graphite composite electrode. The amount of lithium metal serves a few roles in providing the electrochemical energy. For example, the lithium metal provides electrochemical energy for the SEI formation on the graphite surface, redox process for lithium ion intercalation in graphite and free lithium metal. It can be observed, for example in FIG. 9A, that there are free lithium metal and intercalated lithium ions in the graphite electrode film. The near zero voltage delithiation from 0.0 milliampere hour to about 1 milliampere hour in FIG. 9A can be contributed by free lithium metal; whereas, the rise in voltage starting at about 1 milliampere hour to about 2.5 milliampere hour can be due to the de-intercalation process of lithium ion within the graphite. In contrast to FIG. 9A, FIG. 9B supports a delithiation process that involve nearly exclusively through de-intercalation of lithium ion within the graphite based on the voltage profile of about 0.1 volts at the start of the delithiation process. These two examples demonstrate the robustness of the dry electrode formation process to accommodate bulk lithium metal and its ability to readily tailor the desired capacity from the bulk lithium metal, for example by input quantity, in the final electrode.

It will be understood that the mixing apparatus shown in FIGS. 7 and 8A-8C, or other apparatus suitable for mixing carbon material with bulk elemental lithium material, can be employed to perform the other methods described herein, such as those described herein with reference to FIGS. 3-6, and to form the bulk electrode material, films, and/or energy storage devices described herein.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An electrode film, comprising:
   an elemental metal;
   carbon particles, wherein each carbon particle comprises a plurality of pores, at least some of the plurality of pores receive at least some of the elemental metal; and
   a fibrillizable binder,
   wherein the electrode film is substantially free of solvent residue.

2. The electrode film of claim 1, wherein the elemental metal comprises a metal selected from the group consisting of elemental lithium metal, elemental sodium metal, elemental potassium metal, elemental magnesium metal, elemental aluminum metal, and combinations thereof.

3. The electrode film of claim 1, wherein the elemental metal comprises elemental lithium metal.

4. The electrode film of claim 1, wherein the elemental metal comprises elemental metal particles.

5. The electrode film of claim 4, wherein the elemental metal particles comprise a particle size distribution D50 value of about 0.5 μm to about 10 μm.

6. The electrode film of claim 1, wherein the elemental metal comprises about 1 wt % to about 5 wt % of the electrode film.

7. The electrode film of claim 1, wherein the plurality of pores are substantially filled with the elemental metal.

8. The electrode film of claim 1, further comprising a solid electrolyte interface (SEI) layer covering exposed portions of the elemental metal.

9. The electrode film of claim 8, wherein the SEI layer covers exposed portions of the elemental metal that are below an exterior surface of the corresponding carbon particle.

10. The electrode film of claim 1, wherein the carbon particles comprise a particle size distribution D50 value of about 1 μm to about 20 μm.

11. The electrode film of claim 1, wherein the plurality of pores occupy about 10% to about 80% of a volume of the corresponding carbon particle.

12. The electrode film of claim 1, wherein the carbon particles are graphite particles.

13. The electrode film of claim 1, wherein the carbon particles are selected from the group consisting of nanoporous carbon particles, microporous carbon particles, mesoporous carbon particles, macroporous carbon particles, and combinations thereof.

14. The electrode film of claim 1, wherein the carbon particles are selected from the group consisting of activated carbon particles, hierarchically structured carbon particles, structured carbon nanotubes, structured carbon nanowires, structured carbon nanosheets, graphene sheets, surface treated carbon particles, and combinations thereof.

15. The electrode film of claim 1, wherein the fibrillizable binder are selected from the group consisting of polytetrafluoroethylene (PTFE), perfluoropolyolefin, polypropylene, a polyethylene, co-polymers thereof, and combinations thereof.

16. The electrode film of claim 1, wherein the electrode film is free-standing.

17. An energy storage device, comprising:
    a first electrode;
    a second electrode; and
    a separator between the first electrode and the second electrode,
    wherein at least one of the first electrode and the second electrode comprises the electrode film of claim 1.

18. The energy storage device of claim 17, wherein the energy storage device is a lithium ion battery.

19. A method for fabricating an electrode film, comprising:
    combining an elemental metal, a plurality of carbon particles and a fibrillizable binder to form an electrode film mixture; and
    forming an electrode film from the electrode film mixture, wherein the electrode film is substantially free of solvent residue,
    wherein each carbon particle comprises a plurality of pores, and
    wherein at least some of the plurality of pores of the carbon particles receive at least some the elemental metal.

20. The method of claim 19, wherein the combining comprises mixing the elemental metal and the plurality of carbon particles such that the mixing melts at least a portion of the elemental metal to form a molten elemental metal.

21. The method of claim 20, wherein at least some of the molten elemental metal enters the pores of the carbon particles during the mixing.

22. The method of claim 21, wherein forming the electrode film comprises fibrillizing the electrode film mixture.

23. The method of claim 21, further comprising providing a bulk elemental metal, and reducing a size of the bulk elemental metal to form the elemental metal.

24. The method of claim 19, wherein the combining comprises using a carbonate liquid or vapor.

25. The method of claim 19, further comprises forming an SEI layer covering exposed portions of the elemental metal that is below an exterior surface of the corresponding porous carbon particle.

26. The method of claim 23, wherein forming the SEI layer comprises exposing the exposed portions of the elemental metal to an electrolyte solvent vapor.

27. The method of claim 26, wherein exposing the exposed portions of the elemental metal to the electrolyte solvent vapor comprises exposing the exposed portions of the elemental metal to a carbonate vapor.

* * * * *

UNITED STATES PATENT AND TRADEMARK OFFICE
CERTIFICATE OF CORRECTION

PATENT NO. : 12,315,914 B2
APPLICATION NO. : 18/410795
DATED : May 27, 2025
INVENTOR(S) : Hieu Minh Duong et al.

It is certified that error appears in the above-identified patent and that said Letters Patent is hereby corrected as shown below:

In the Specification

In Column 18, Line 17, delete "a Waning® blender" and insert --a Waring® blender--.

In Column 21, Line 49, delete "a Warning® blender" and insert --a Waring® blender--.

In the Claims

Column 24, Claim 26, Line 47 (Approx.), delete "wherein" and insert --claim 25, wherein--.

Signed and Sealed this
Second Day of September, 2025

Coke Morgan Stewart
*Acting Director of the United States Patent and Trademark Office*